United States Patent
Hoffjann et al.

(10) Patent No.: US 10,173,086 B2
(45) Date of Patent: Jan. 8, 2019

(54) SUPPLY SYSTEM AND METHOD FOR PROVIDING ELECTRIC ENERGY, OXYGEN DEPLETED AIR AND WATER AS WELL AND AIRCRAFT HAVING SUCH A SUPPLY SYSTEM

(71) Applicant: Airbus Operations GmbH, Hamburg (DE)

(72) Inventors: Claus Hoffjann, Hamburg (DE); Barnaby Law, Hamburg (DE); Guido Klewer, Hamburg (DE); Hauke-Peer Lüdders, Hamburg (DE)

(73) Assignee: Airbus Operations GmbH (DE)

( * ) Notice: Subject to any disclaimer, the term of this patent is extended or adjusted under 35 U.S.C. 154(b) by 579 days.

(21) Appl. No.: 14/808,273

(22) Filed: Jul. 24, 2015

(65) Prior Publication Data

US 2016/0030781 A1 Feb. 4, 2016

(30) Foreign Application Priority Data

Jul. 29, 2014 (EP) .................................. 14178937

(51) Int. Cl.
*A62C 3/08* (2006.01)
*B64D 37/32* (2006.01)
(Continued)

(52) U.S. Cl.
CPC .............. *A62C 3/08* (2013.01); *A62C 5/008* (2013.01); *A62D 1/0092* (2013.01);
(Continued)

(58) Field of Classification Search
CPC ....... A62C 3/08; A62C 5/008; A62C 99/0018; H01M 8/04843; H01M 8/04932;
(Continued)

(56) References Cited

U.S. PATENT DOCUMENTS

2010/0221642 A1* 9/2010 Frahm .................... B64D 11/02
429/512
2012/0292058 A1 11/2012 Bleil et al.
(Continued)

FOREIGN PATENT DOCUMENTS

DE 101 42 125 A1 3/2003
EP 2 624 353 A1 8/2013
(Continued)

OTHER PUBLICATIONS

Extended European Search Report EP 14178937.0 (dated Jan. 21, 2015).

*Primary Examiner* — Gary D Harris
(74) *Attorney, Agent, or Firm* — Lerner, David, Littenberg, Krumholz & Mentlik, LLP (57) ABSTRACT

A supply system for providing at least oxygen depleted air and water in a vehicle includes a catalytic converter, at least one hydrogen supply means, at least one air supply means, at least one outlet for oxygen depleted air, and a control unit coupled with the catalytic converter. The catalytic converter is couplable with the hydrogen supply means and is adapted for producing water under consumption of hydrogen from the at least one hydrogen supply means and oxygen. The catalytic converter is further couplable with the at least one air supply means for additionally producing oxygen depleted air. Further, the control unit is adapted for selectively operating the catalytic converter based on a demand of water and oxygen depleted air.

13 Claims, 6 Drawing Sheets

(51) Int. Cl.
*H01M 8/04119* (2016.01)
*H01M 8/04291* (2016.01)
*A62C 5/00* (2006.01)
*A62D 1/00* (2006.01)
*B01J 19/00* (2006.01)
*C01B 5/00* (2006.01)
*H01M 8/04746* (2016.01)
*H01M 8/04828* (2016.01)
*H01M 8/04858* (2016.01)
*B64D 41/00* (2006.01)
*A62C 99/00* (2010.01)

(52) U.S. Cl.
CPC ....... *B01J 19/0006* (2013.01); *B01J 19/0053* (2013.01); *B64D 37/32* (2013.01); *C01B 5/00* (2013.01); *H01M 8/04164* (2013.01); *H01M 8/04291* (2013.01); *H01M 8/04761* (2013.01); *H01M 8/04843* (2013.01); *H01M 8/04932* (2013.01); *A62C 99/0018* (2013.01); *B01J 2219/00186* (2013.01); *B01J 2219/00761* (2013.01); *B64D 2041/005* (2013.01); *H01M 2220/20* (2013.01); *H01M 2250/20* (2013.01); *Y02T 50/44* (2013.01); *Y02T 90/32* (2013.01); *Y02T 90/36* (2013.01)

(58) Field of Classification Search
CPC ......... H01M 8/04761; H01M 8/04291; H01M 2250/20; B01J 19/0006; B01J 19/0053; B01J 2219/00761; B01J 2219/00; C01B 5/00; A62D 1/0092; B64D 37/32; Y02T 90/36; Y02T 50/44; Y02T 90/32
USPC .......................................................... 429/8
See application file for complete search history.

(56) References Cited

U.S. PATENT DOCUMENTS

2013/0200216 A1    8/2013  Mock et al.
2013/0320136 A1*  12/2013  Zhou ..................... B64D 41/00
                                                              244/58

FOREIGN PATENT DOCUMENTS

WO    2013/140306 A1    9/2013
WO    2013/140312 A2    9/2013
WO    2013/151690 A1   10/2013

* cited by examiner

SUPPLY SYSTEM AND METHOD FOR PROVIDING ELECTRIC ENERGY, OXYGEN DEPLETED AIR AND WATER AS WELL AND AIRCRAFT HAVING SUCH A SUPPLY SYSTEM

TECHNICAL FIELD

The invention relates to a supply system and a method for providing electric energy, oxygen depleted air and water as well as to an aircraft having such a supply system.

BACKGROUND OF THE INVENTION

Today's aircraft are often equipped with separate systems for emergency power supply and cargo fire suppression. For a so-called "total engine flame out" (TEFO) situation or the loss of a main electrical power supply, a ram air turbine for providing emergency power is designated. Ram air turbines are capable for providing sufficient power when the speed of the impinging ram air is sufficient. However, this may be critical in a phase close to touchdown during the landing phase of the aircraft.

For extinguishing or suppression of a fire in a cargo compartment of an aircraft, Halon fire extinguishers were often used. Due to adverse effects of Halon for the ozone layer and as Halon will be limited by authorities, a replacement of Halon is necessary.

In civil aviation, potable water systems are well-known, which use on board water storage tanks for providing the quantity of water used in flight by passengers and crew and lavatories and galleys. It is known to generate potable water on board by means of fuel cells under consumption of hydrogen and oxygen. However, this kind of water generation is directly coupled with the generation of electrical power. Hence, water will only be produced if there is a demand for electric power.

In case air is used as an oxidant, fuel cells deplete the oxygen content of the air when generating water. If the remaining oxygen content in the cathode air is reduced to approximately 12%, this oxygen depleted air is usable for suppressing fire in case of a fire event on board or be used for fuel tank inerting or increasing safety in the fuel system. The depletion of oxygen is directly coupled with the demand for electric power and the stoichiometry in the fuel cell.

BRIEF SUMMARY OF THE INVENTION

Consequently, an aspect of the invention may provide a supply system for providing at least oxygen depleted air and water, which is capable to independently generate oxygen depleted air and optionally water A supply system for providing at least oxygen depleted air and water is proposed, the system comprising a catalytic converter, at least one hydrogen supply means, at least one air supply means, at least one outlet for oxygen depleted air, and a control unit coupled with the catalytic converter. The catalytic converter is couplable with the hydrogen supply means, the catalytic converter is adapted for producing water under consumption of hydrogen from the at least one hydrogen supply means and oxygen, the catalytic converter is couplable with the at least one air supply means for additionally producing oxygen depleted air, and the control unit is adapted for selectively operating the catalytic converter based on a demand of water and oxygen depleted air.

The catalytic converter is adapted for providing water in gaseous or liquid form and oxygen depleted air when supplied with air from the at least one air supply means and hydrogen from the at least one hydrogen supply means. The converter comprises a catalyst, i.e. a chemical substance that increases the rate of the intended chemical reaction without being consumed. In particular, the catalyst of the catalytic converter allows to lower the process temperature, thereby reducing the demand for cooling power. For example, the catalyst may be realized as a platinum powder coating inside a converter housing.

The hydrogen supply means may be a hydrogen port in a hydrogen supply system, a section of a hydrogen duct, a storage tank or any other means capable of supplying hydrogen or a hydrogen containing gas to the fuel cell. In this regard, the hydrogen does not necessarily have to be pure hydrogen. Instead, it may also be generated from a fuel processor, which reforms an ordinary aircraft fuel into hydrogen enriched gas for fuel cells.

In analogy, the air supply means may be any suitable means for providing air, such as a ram air inlet, a bleed air port of a turbojet engine, a port integrated into or coupled with a recirculation duct of an environmental control system in an aircraft, a cargo compartment extraction valve, or any other means.

The system may further comprise a dedicated outlet for oxygen depleted air, which may be coupled with several active components, or the system may include one or more outlets for oxygen depleted air at the different active components.

The catalytic converter is adapted for providing water in gaseous or liquid form and oxygen depleted air when supplied with air from the at least one air inlet and hydrogen from the at least one hydrogen supply means. Depending on the temperature necessary for conducting the chemical reaction between hydrogen from the at least one hydrogen supply means and an oxidant, the generated water may comprise a certain temperature and, consequently, a certain aggregation state.

Consequently, the direct relation between electric power demand, demand for oxygen depleted air and the stoichiometry in a fuel cell stack and water production in a fuel cell system may be eliminated through the use of a catalytic converter capable of providing water and, if desired, oxygen depleted air.

In an advantageous embodiment, the supply system further comprises a fuel cell, which is couplable with the hydrogen supply means. The fuel cell is adapted for producing water and electric energy through conducting a fuel cell process under consumption of hydrogen from the at least one hydrogen supply means and oxygen. Further, the control unit is additionally adapted for selectively operating the fuel cell based on a demand of water, oxygen depleted air and electric energy.

The fuel cell may be realized by means of a single fuel cell, a fuel cell stack having a plurality of interconnected fuel cells or an arrangement of fuel cells or fuel cell stacks in a series or parallel connection. The fuel cell is couplable with the at least one hydrogen supply means, such that hydrogen is supplyable to the fuel cell on demand. The necessary oxidant may be provided in the form of oxygen, air or any other oxygen containing gas, which allows to supply a sufficient flow of oxygen to the fuel cell.

The fuel cell itself may be of any suitable type, which may include a low temperature, a medium temperature or a high temperature fuel cell type that produces electricity and heat as well as water, which arises at a cathode side of the fuel cell. For the use in vehicles, the fuel cell may preferably include proton exchange membrane fuel cells, also known as polymer electrolyte membrane fuel cells.

Hence, the fuel cell may be operated when water and electric power are required at the same time. The catalytic converter may produce water on its own, without having to deliver electric power. Also, oxygen depleted air, water and electric power may be provided at the same time when the fuel cell is supplied with air and hydrogen. The fuel cell and the catalytic converter may produce water at the same time or separately at different times. In particular, the fuel cell is only operated when a demand for electrical power has to be met.

A still further advantageous embodiment comprises an oxygen supply means for providing substantially pure oxygen to the at least one fuel cell. This means that the fuel cell may be supplied with pure oxygen, such that only water is produced in the fuel cell, without oxygen depleted air being generated. However, it is preferred to provide pure oxygen only to one of the installed active components, i.e. the fuel cell, such that a demand for oxygen depleted air may be met by at least the other active component.

In case the fuel cell is supplied with pure oxygen, the system according to the invention may be used as an emergency power supply unit, which is completely independent from any other component in the vehicle, as long as the oxygen and hydrogen supply is maintained.

Still further, the control unit is adapted for operating the catalytic converter and the fuel cell at the same time for producing at least water and electric energy. This may reduce the total weight of the system according to the invention, as for meeting the water demand arising in the vehicle both active components may be used, which does not require the dimensioning of one or both of them to meet the demand alone.

In an advantageous embodiment, the fuel cell is couplable with the at least one air supply means for additionally producing oxygen depleted air. For a quick supply of oxygen depleted air, e.g. in case of a demand for fire suppression, the fuel cell may also be couplable with the at least one air supply means, allowing to increase the total flow rate of oxygen depleted air. Depending on the resulting flow rate it may be possible to also provide a fire knock down function. However, the fuel cell may only provide oxygen depleted air when the electrical power, which is generated during the fuel cell process, can be provided to an electrical load. It may be preferred that the outlets for oxygen depleted air at the fuel cell and the catalytic converter are segregated. If a combination of emergency power generation and generation of oxygen depleted air is required, the fuel cell may be operated under consumption of pure oxygen, which may be necessary e.g. in a TEFO case. A segregation of the respective outlet of the fuel cell and the catalytic converter prevents that in the above case pure oxygen reaches the catalytic converter, which would otherwise hinder the generation of oxygen depleted air, may lead to an overheat in the catalytic converter or the introduction of oxygen into the space that needs to be inerted, i.e. leading to a fire acceleration.

It is preferred that the system comprises at least one of a water separator and a condenser, thereby enabling the reliable separation of liquid water or the condensation of water vapor during the operation of the system. A condenser may be required when water occurs in gaseous form, for example downstream the catalytic converter, depending on its operating temperature, or downstream a fuel cell operating at elevated temperatures.

For fire suppression during normal operation of the vehicle, which may be an aircraft, the air supply means comprises a bleed air line from a turbojet engine. It goes without saying that the bleed air supplied from a bleed air line should be pre-cooled for preventing damages to the fuel cell or the catalytic converter. The supply of bleed air is reliable and furthermore comprises a steady and adjustable pressure level.

In a still further embodiment, the catalytic converter comprises a housing, which is arranged in an air duct, and wherein the catalytic converter is adapted for condensing water generated in the catalytic converter at the housing. The power required for condensation is clearly reduced. Exemplarily, the catalytic converter may be arranged in a ram air duct, in particular when the vehicle is an aircraft, such that ram air having a low temperature impinges the housing of the catalytic converter and is able to compensate the latent evaporation heat.

Arranging the catalytic converter into an air duct, in which a constant air flow occurs, allows cooling the catalytic converter without a sophisticated cooling system. Additionally, the air duct, be it a ram air duct, a duct for leading exhaust air of a compartment or cooling air from another device, allows a heat exchanger being integrated into the air duct, which heat exchanger may be coupled with a cooling system for the fuel cell, if used in the system according to the invention, which clearly simplifies the overall cooling system for the active components in the system.

It goes without saying that the catalytic converter, the fuel cell and power electronics for converting the electrical voltage and current from the fuel cell may comprise any kind of cooling system, be it an air or cooling liquid based cooling system, as an open or a closed cooling loop, which cooling systems may be combined or realized as separate cooling systems.

For clearly increasing the process of catalytic conversion, the catalytic converter may comprise a turbo machine having a compressor and a turbine. The catalytic converter may then be adapted for providing the catalytic conversion in a position between the compressor and the turbine, such that compressed air is fed into the catalytic converter, after which the products generated in the catalytic converter flow through the turbine. For example, in case the fuel cell system is used in an aircraft, a situation may arise in which the aircraft is on ground with doors closed and engines not running, such that no bleed air is available for a fire knock down function. However, a substitute may be generated by means of a small, preferably electrically operated turbo machine, which also makes use of the temperature raise of the catalytic conversion for decreasing the required power for the compressor due to the mechanical power created by the turbine, thereby leading to a great efficiency of the catalytic converter in this operation case. Further, due to the expansion in the turbine, the oxygen depleted air flow is pre-cooled.

In another advantageous embodiment, an air inlet of the catalytic converter is coupled with an exhaust air outlet of a compartment in the vehicle and the at least one outlet for oxygen depleted air is coupled with an air inlet of the compartment. Fire suppression in this compartment is clearly improved through recirculating air from the compartment into an air inlet of the catalytic converter, which reduces the oxygen content through the catalytic conversion and lets the oxygen depleted air flow back into the respective compartment. Using such a recirculation improves the speed of oxygen depletion in the respective compartment and may, if the capacity of the catalytic converter is sufficient, provide for a fire knock-down. However, the catalytic converter requires an additional source of air for maintaining the catalytic conversion process, if the oxygen content in the respective compartment is below a certain level.

The system may further be adapted for selectively switching between an air supply and oxygen supply to the fuel cell based on the demand on water, oxygen depleted air and electrical power through appropriately switching respective supply valves.

The invention further relates to a method for providing at least oxygen depleted air and water in an aircraft, the method comprising operating a catalytic converter for producing water under consumption of hydrogen from at least one hydrogen supply means couplable with a hydrogen supply means of the catalytic converter and coupling at least one air supply means with the catalytic converter and operating the catalytic converter for additionally producing oxygen depleted air wherein based on a demand of water and oxygen depleted air.

Further, the method may comprise recirculating exhaust air from a compartment in the vehicle to an air inlet of the catalytic converter.

The invention further relates to an aircraft having such a supply system.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
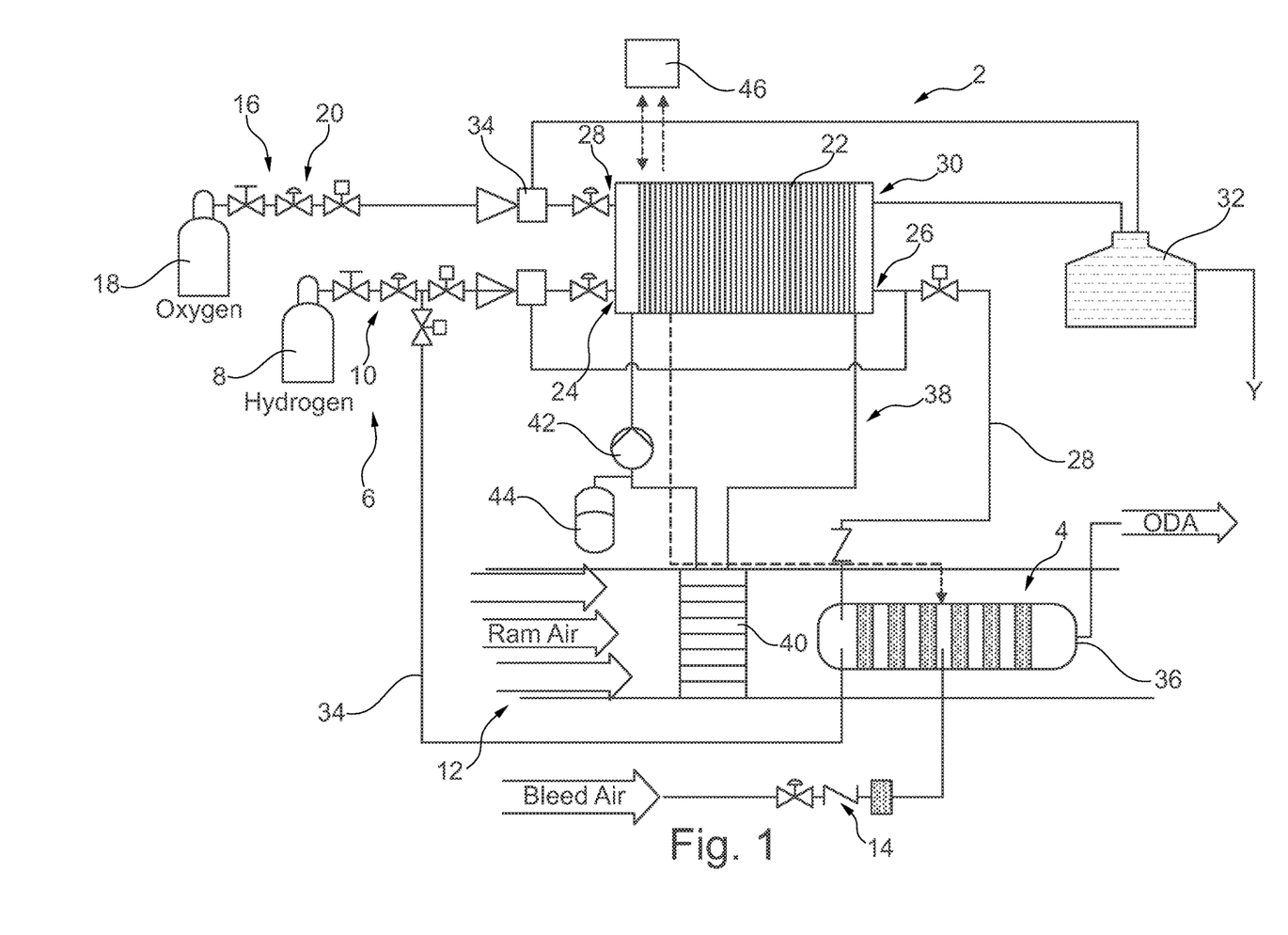
FIG. 1 shows a system for providing oxygen depleted air, water and electric energy in a first exemplary embodiment having a supply of pure oxygen to a fuel cell and an air supply to a catalytic converter.

FIG. 1 shows a first exemplary embodiment of a supply system 2 for providing oxygen depleted air and water, the system 2 comprising a catalytic converter 4, a hydrogen supply means 6 having a hydrogen reservoir 8 and a plurality of valves 10, a first air supply means 12 realized as a ram air channel, a second air supply means 14 realized as a bleed air line as well as an oxygen supply means 16 comprising an oxygen reservoir 18 as well as a series of valves 20.

Further, a fuel cell 22 realized as a fuel cell stack is present, which fuel cell 22 is couplable with the oxygen supply means 16 and the hydrogen supply means 6. Through conducting a fuel cell process, the fuel cell 22 produces electrical energy and water. Hydrogen from the hydrogen supply means 6 flows into an anode inlet 24 and residual hydrogen exits an anode outlet 26, from where it may be conveyed to the anode inlet 24 or to a hydrogen supply line 28, which will be further described below. Hydrogen ions reach the cathode side and react with oxygen flowing into the fuel cell 22 through a cathode inlet 28 to form water flowing off a cathode outlet 30.

Exemplarily, a water separator 32 is coupled with the cathode outlet 30 and is adapted to separate water from residual gas flowing from the cathode outlet 30. Water accumulating in the water separator 32 may be fed back to an injecting means 34 upstream of the cathode inlet 28 in order to provide a humidification of the oxygen flowing into the cathode inlet 28 for improving the operation of the fuel cell 22.

The catalytic converter 4 is coupled with the hydrogen supply means 6 through a first hydrogen supply line 34 and is furthermore couplable with the hydrogen supply line 28 as described above. Both hydrogen supply lines 28 and 34 provide hydrogen to the catalytic converter 4 which is supplied with air either from the first air supply means 12 or the second air supply means 14. It goes without saying that both air supply means 12 and 14 may also be used at the same time while it should be prevented that air from one of the air supply means enters the other air supply means driven by a pressure difference. The catalytic converter 4 conducts the reaction between oxygen from the air and hydrogen in order to provide oxygen depleted air ("ODA") at an oxygen depleted air outlet 36. Water vapor that arises from the chemical reaction may be drawn away by the surrounding airflow.

Consequently, the system 2 is able to provide oxygen depleted air, water and electrical energy basically independent from any other devices and nearly requires a source of oxygen and hydrogen for conducting the fuel cell process and air and hydrogen for conducting the catalytic reaction.

For cooling the fuel cell 22, a cooling circuit 38 is present, which extends from a cooler 40 mounted in the first air supply means 12 to the fuel cell 22 and back. For conveying a cooling fluid flowing inside this cooling circuit 38, a pump 42 as well as a buffering tank 44 are present.

The system 2 further comprises a control unit 46, which is coupled with the fuel cell 22 and the catalytic converter 4 for controlling their operations. It goes without saying that also the plurality of valves 10 or 20 are controllable through the control unit 46, which is then responsible for selectively operating one or both of the fuel cell 22 and the catalytic converter 4 for providing oxygen depleted air, water and electrical energy based on the respective demands.

Figure 2:
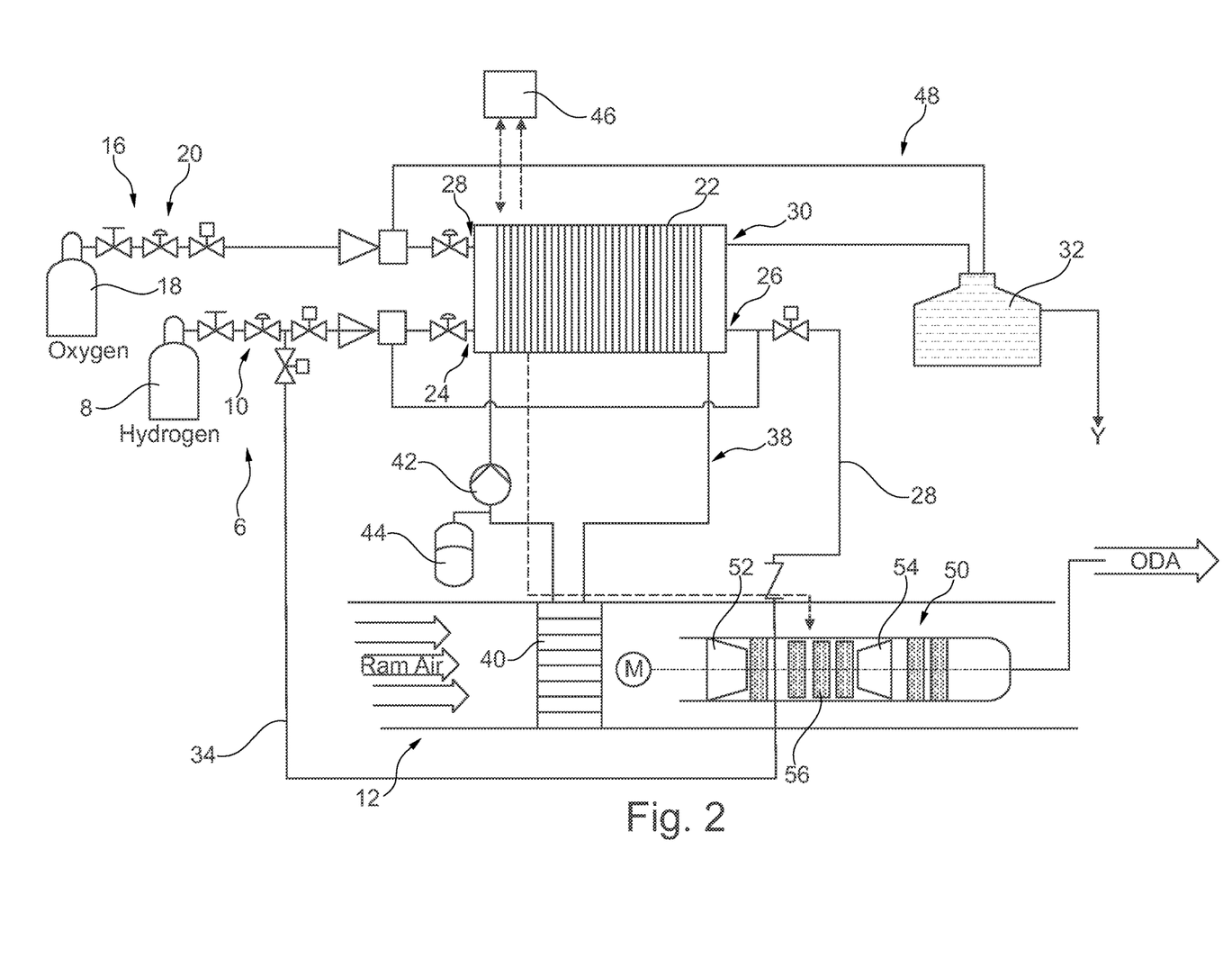
FIG. 2 shows another embodiment having a catalytic converter with an integrated turbo machine.

In FIG. 2, a system 48 is shown, which slightly differs from system 2 of FIG. 1. The main difference lies in converter 50, which is a combined turbo machine having a catalytic converter, which is able to provide a large mass flow of oxygen depleted air suitable for a fire know down process. A compressor 52 thereby compresses ram air from the air supply means 12 and expands the flow in a turbine 54. Between compressor 52 and turbine 54, a plurality of catalytic converters 56 may be arranged as well as downstream of the turbine 54. After providing the knock down function, the operation of the turbo machine may be interrupted, such that a lower mass flow for fire suppression may be initiated.

Figure 3:
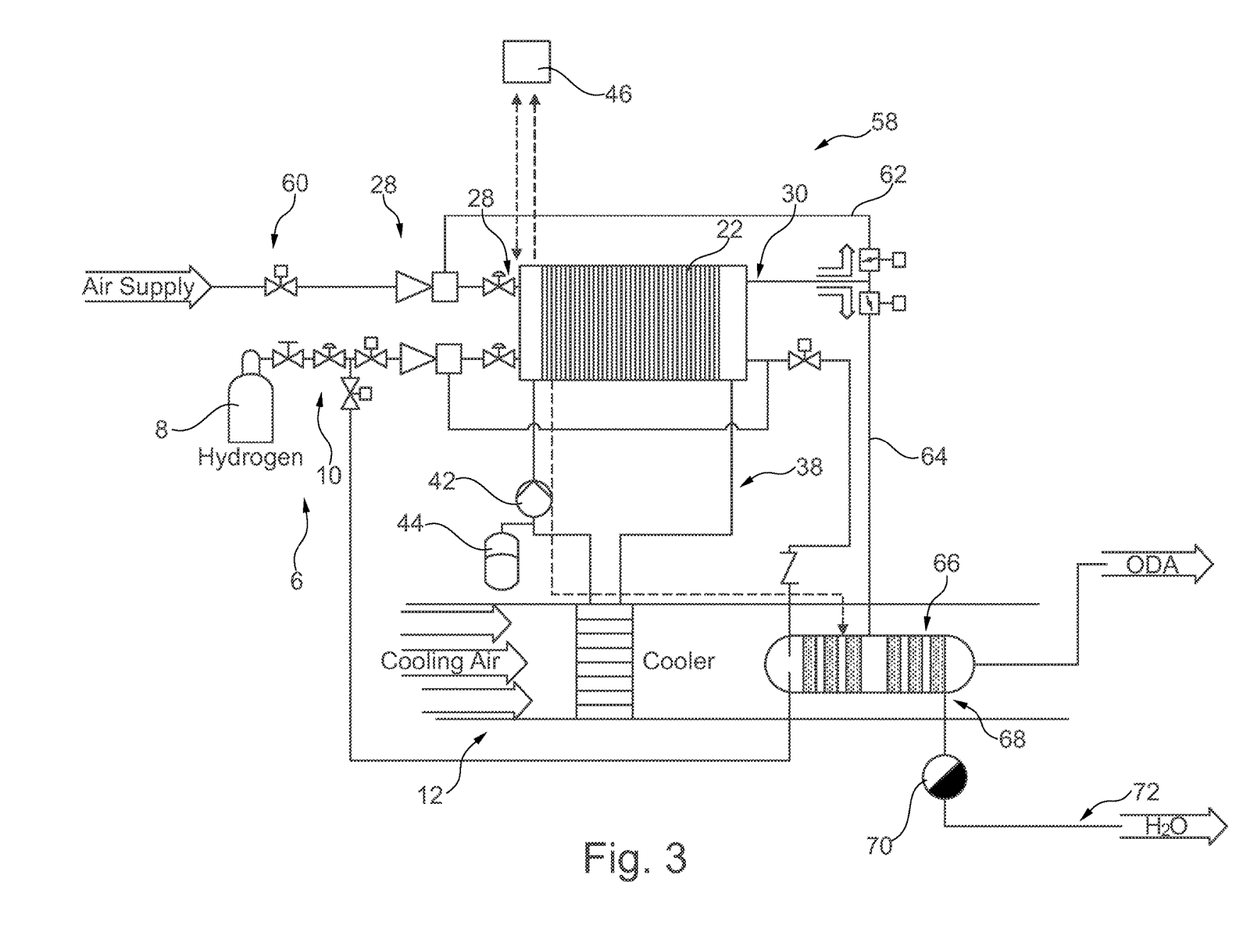
FIG. 3 shows a further embodiment with an air supply to the fuel cell.

In FIG. 3, a system 58 is shown, which is simplified compared to system 2 and system 48 from FIGS. 1 and 2. For example, fuel cell 22 is provided with hydrogen from hydrogen supply means 6, while the oxygen supply is realized through a third air supply means 60 coupled with the cathode inlet 28. Consequently, not only water occurs at the cathode outlet 30 but also oxygen depleted air, which may be recirculated through a recirculation duct 62 to the cathode inlet 28 or may be fed to a catalytic converter 4 as a fourth air supply means 64. Consequently, oxygen depleted air from the fourth air supply means 64 is even more reduced in its oxygen content while the first air supply means 12 may be reduced to a mere supply of cooling air.

The catalytic converter 66 comprises an additional function in the form of a condenser, which is able to provide condensed water at a water outlet 68, which may be fed through a float drain valve 70 to a dedicated water supply outlet 72.

Figure 4:
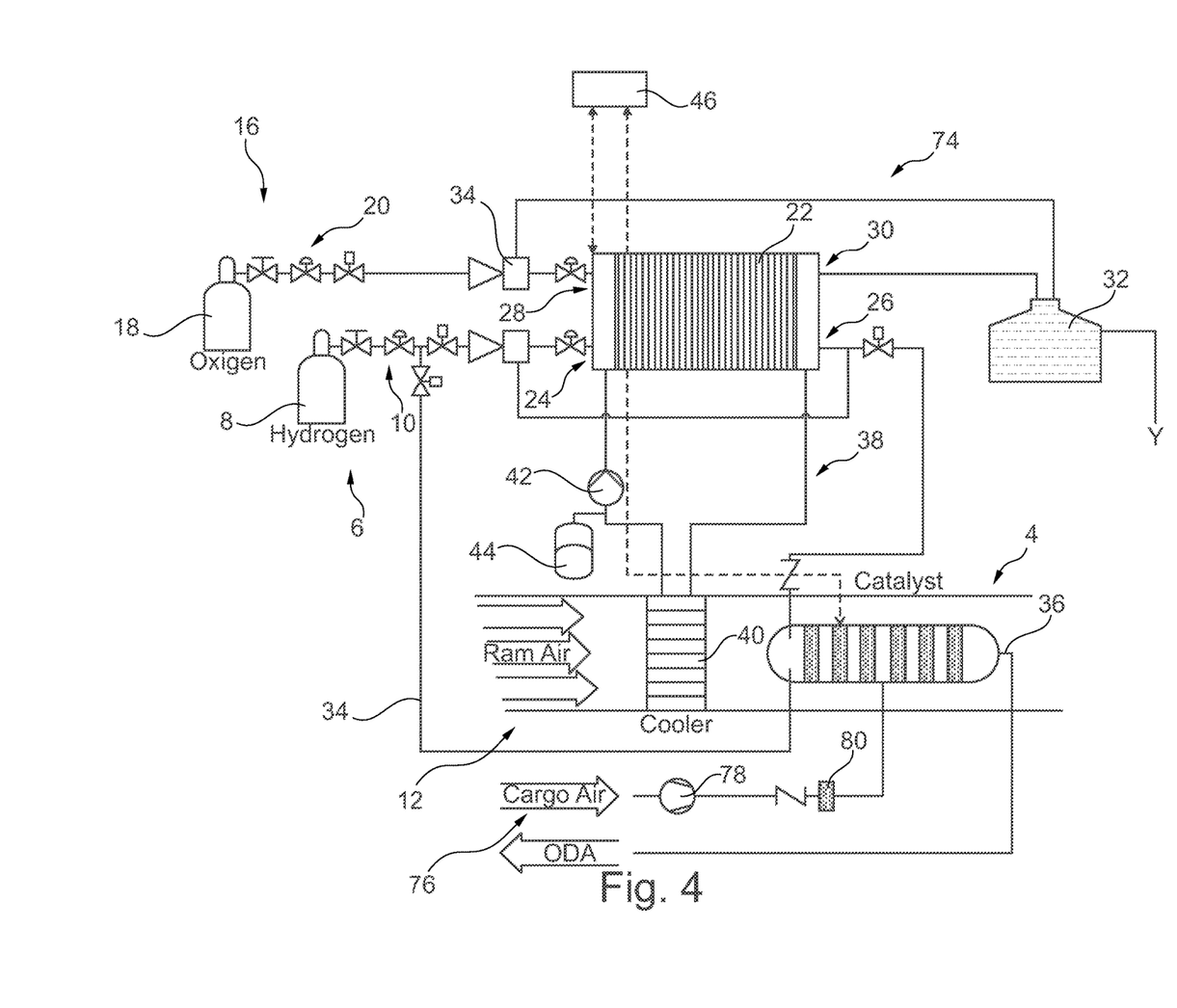
FIG. 4 shows a still further embodiment with a cargo air supply to the catalytic converter.

FIG. 4 shows a system 74 for providing oxygen depleted air, water and electric energy, which system 74 is based on system 2 shown in FIG. 1. Here, the catalytic converter 4 is supplied with air from the first air supply means 12 and, at the same time, is supplied with air from a fifth air supply means 76 that draws off used cargo air by means of a conveying device 78, which provides the cargo air through a safety catalyst 80 into the catalytic converter 4. Oxygen depleted air that exits the oxygen depleted air outlet 36 may be fed to a cargo compartment, which provides the used cargo air for the fifth air supply means 76. By this process, the oxygen content may be even more reduced inside the cargo compartment, which leads to a clearly improved fire suppression.

Figure 5:
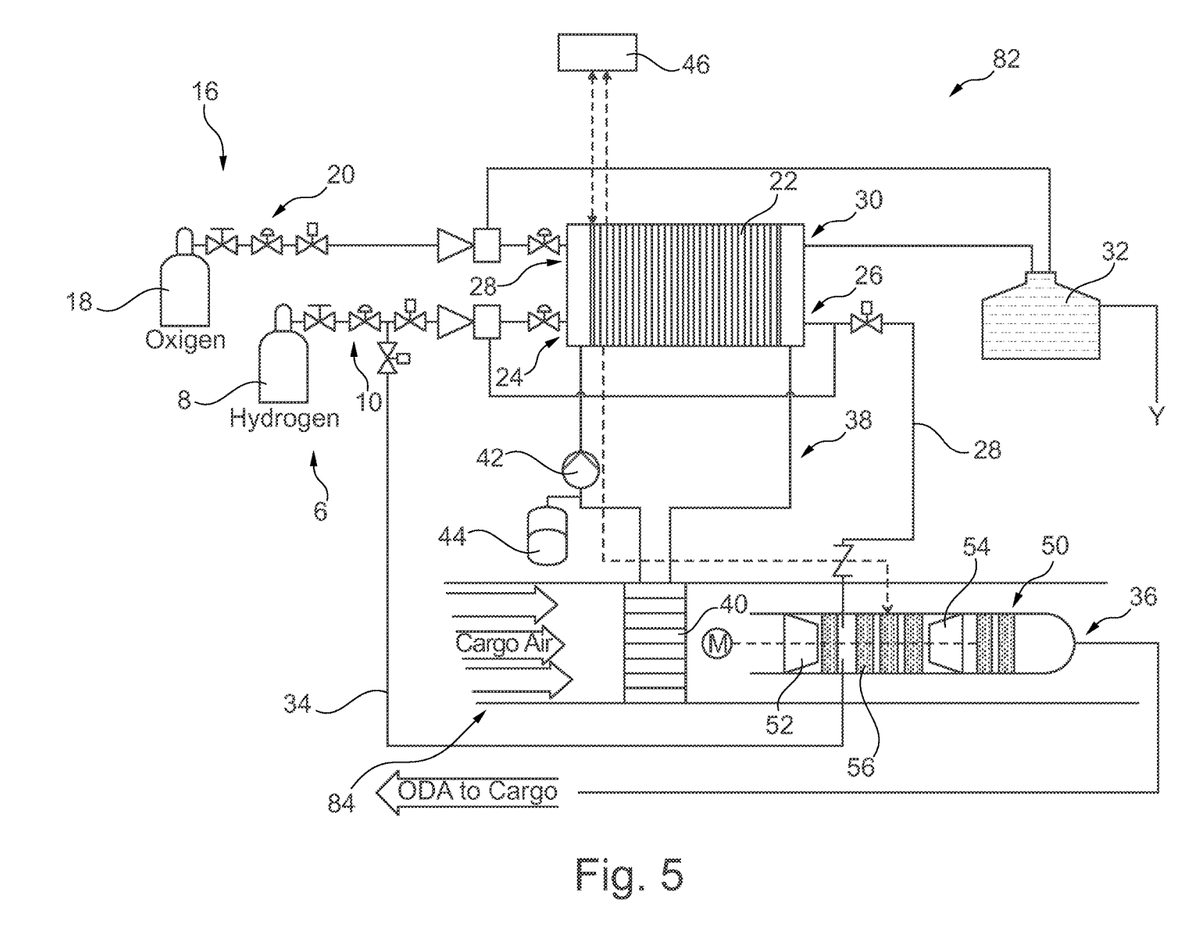
FIG. 5 shows another embodiment with a catalytic converter with an integrated turbo machine and cargo air supply to the converter.

In FIG. 5, a system 82 for providing oxygen depleted air, water and electrical energy is shown, which is based on the system 48 of FIG. 2. Here, the first air supply means 12 is slightly modified and named sixth air supply means 84, which is provided with cargo air instead of ram air, but is still realized as a channel or duct for housing the catalytic converter 50 as well as the cooler 40 for fuel cell 22. By feeding the oxygen depleted air arising at the oxygen depleted air outlet 36 into the cargo compartment that provides the cargo air, a still further improved oxygen depletion may be accomplished.

Figure 6:
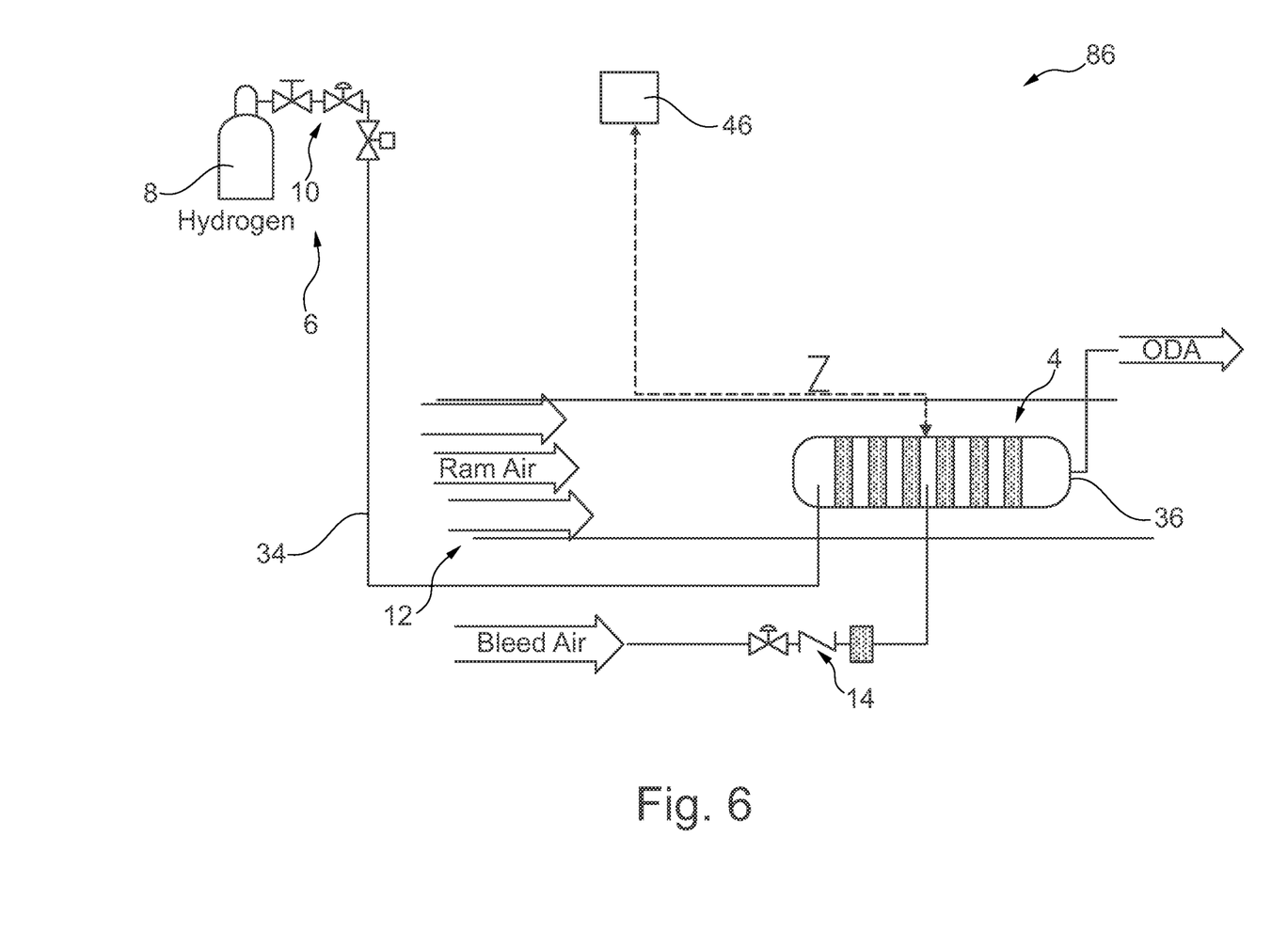
FIG. 6 shows another, simplified embodiment with only a catalytic converter.

In this regard it goes without saying that, as shown in FIG. 6, a system 86 for providing oxygen depleted air and water may be possible without the use of a fuel cell 22. The use for fire suppression or fire knock down through a catalytic converter may clearly improve the efficiency of the aircraft in terms of weight and fuel consumption as alternative solutions for providing an inert gas or water comprise a clearly higher weight.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which are described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A supply system for providing at least oxygen depleted air and water in a vehicle, the system comprising:
    a fuel cell;
    an independent catalytic converter;
    at least one hydrogen supply means;
    at least one air supply means;
    at least one outlet for oxygen depleted air; and
    a control unit coupled with the catalytic converter,
    wherein the fuel cell and the independent catalytic converter are couplable with the hydrogen supply means,
    wherein the fuel cell is adapted for producing water and electric energy through conducting a fuel cell process under consumption of hydrogen from the at least one hydrogen supply means and oxygen;
    wherein the independent catalytic converter is adapted for producing water under consumption of hydrogen from the at least one hydrogen supply means and oxygen,
    wherein the independent catalytic converter is couplable with the at least one air supply means for additionally producing oxygen depleted air, and
    wherein the control unit is adapted for selectively operating one or both of the fuel cell and the independent catalytic converter based on a demand for water, oxygen depleted air, and electrical energy,
    wherein the independent catalytic converter comprises a turbo machine having a compressor and a turbine.

2. The supply system of claim 1, further comprising an oxygen supply means for providing oxygen to the fuel cell in the absence of an air supply.

3. The supply system of claim 1, wherein the control unit is adapted for operating the independent catalytic converter and the fuel cell at the same time for producing at least water and electric energy.

4. The supply system of claim 1, wherein the fuel cell is couplable with the at least one air supply means for additionally producing oxygen depleted air.

5. The supply system of claim 1, further comprising at least one of a water separator and a condenser.

6. The supply system of claim 1, wherein the at least one air supply means comprises a bleed air line from a turbojet engine.

7. The supply system of claim 1,
    wherein the independent catalytic converter comprises a housing, which is arranged in an air channel, and
    wherein the independent catalytic converter is adapted for condensing water generated in the catalytic converter at the housing.

8. The supply system of claim 1,
    wherein an air inlet of the independent catalytic converter is coupled with an exhaust air outlet of a compartment in the vehicle, and
    wherein the at least one outlet for oxygen depleted air is coupled with an air inlet of the compartment.

9. A method for providing at least oxygen depleted air and water in an aircraft, the method comprising:
    operating a catalytic converter comprising a turbo machine having a compressor and a turbine for producing water under consumption of hydrogen from at least one hydrogen supply means couplable with a hydrogen supply means of the catalytic converter, wherein the catalytic converter is operated independently of a fuel cell, the fuel cell being adapted for producing water and electric energy through conducting a fuel cell process under consumption of hydrogen from the at least one hydrogen supply means and oxygen; and coupling at least one air supply means with the catalytic converter and operating the catalytic converter for additionally producing oxygen depleted air based on a demand of water and oxygen depleted air.

10. The method of claim 9, further comprising operating the fuel cell for producing water and electrical power under consumption of hydrogen from the at least one hydrogen supply means couplable with a hydrogen supply means of the fuel cell and oxygen.

11. The method of claim 9, further comprising recirculating exhaust air from a compartment in the vehicle to an air inlet of the catalytic converter.

12. The method of claim 9, wherein the method further comprises operating the turbo machine.

13. An aircraft having a supply system comprising:
a fuel cell;
an independent catalytic converter;
at least one hydrogen supply means;
at least one air supply means;
at least one outlet for oxygen depleted air; and
a control unit coupled with the independent catalytic converter, wherein the fuel cell and the independent catalytic converter are couplable with the hydrogen supply means, wherein the fuel cell is adapted for producing water and electric energy through conducting a fuel cell process under consumption of hydrogen from the at least one hydrogen supply means and oxygen, wherein the independent catalytic converter is adapted for producing water under consumption of hydrogen from the at least one hydrogen supply means and oxygen, wherein the independent catalytic converter is couplable with the at least one air supply means for additionally producing oxygen depleted air, and wherein the control unit is adapted for selectively operating one or both of the fuel cell and the independent catalytic converter based on a demand for water, oxygen depleted air, and electrical energy, and wherein the independent catalytic converter comprises a turbo machine having a compressor and a turbine.

* * * * *